Oct. 31, 1933.  E. E. BARTLETT  1,933,491
GRAIN HEADER
Filed Feb. 10, 1932  2 Sheets-Sheet 1

E. E. Bartlett
INVENTOR

BY Victor J. Evans & Co.
ATTORNEY

Oct. 31, 1933.  E. E. BARTLETT  1,933,491
GRAIN HEADER
Filed Feb. 10, 1932  2 Sheets-Sheet 2
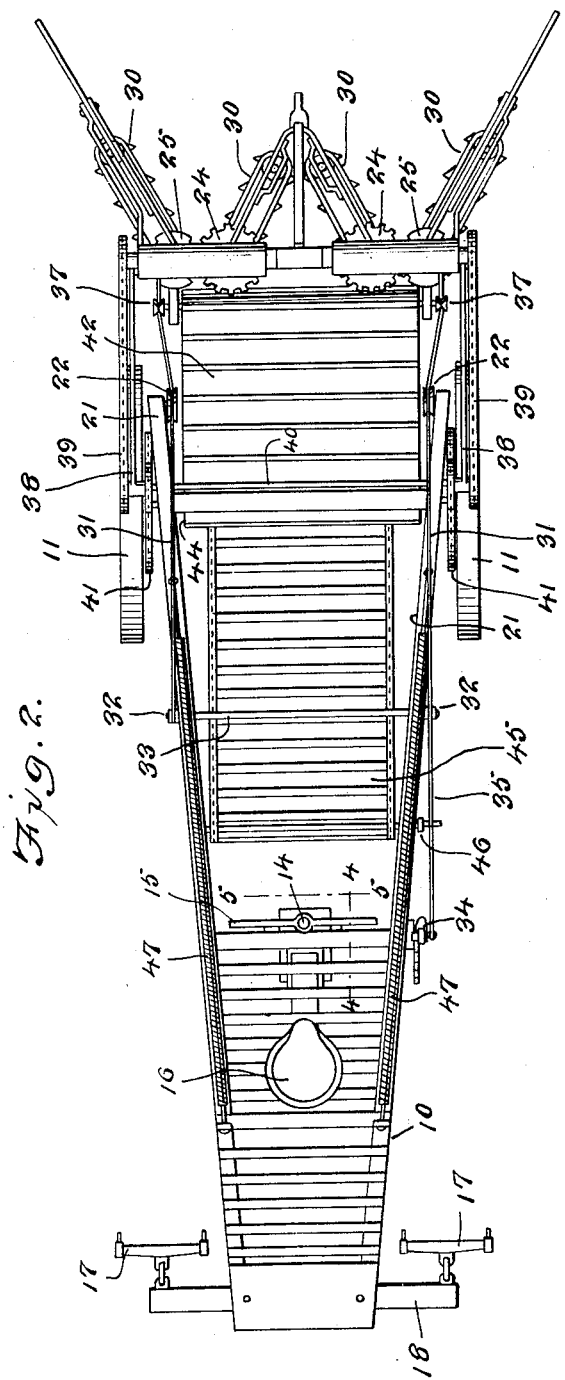
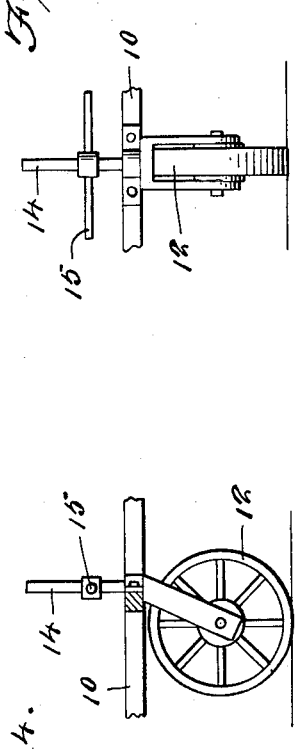
E. E. Bartlett
INVENTOR
BY Victor J. Evans & Co.
ATTORNEY Patented Oct. 31, 1933

1,933,491

UNITED STATES PATENT OFFICE 1,933,491

GRAIN HEADER

Ernest E. Bartlett, George West, Tex., assignor to B & B Manufacturing Co., Inc., a corporation of Texas Application February 10, 1932. Serial No. 592,159

2 Claims. (Cl. 56—56)

The object of the invention is to provide a double row grain header particularly adapted for use in connection with draft animals and so arranged with respect to the manner in which the draft animals are hitched that the latter may require no attention on the part of the operator who may devote his whole time to the operation of the machine just as if it were power driven; to provide a header of the kind indicated which, while permitting adjustment of the heading or cutting elements to suit the condition of the grain being operated upon, may have a conveyor for conveying the cut grain to a depository easily and conveniently emptied or dumped when desired; and generally to provide apparatus of the kind indicated which is of simple form and susceptible of cheap manufacture.

With this object in view, the invention consists in a construction and combination of parts of which a preferred embodiment is illustrated in the accompanying drawings but to which the invention is not to be restricted further than is imposed in limitations set out in the appended claims.

In the drawings:

Figure 1 is a side elevational view of a header constructed in accordance with the invention.

Figure 2:
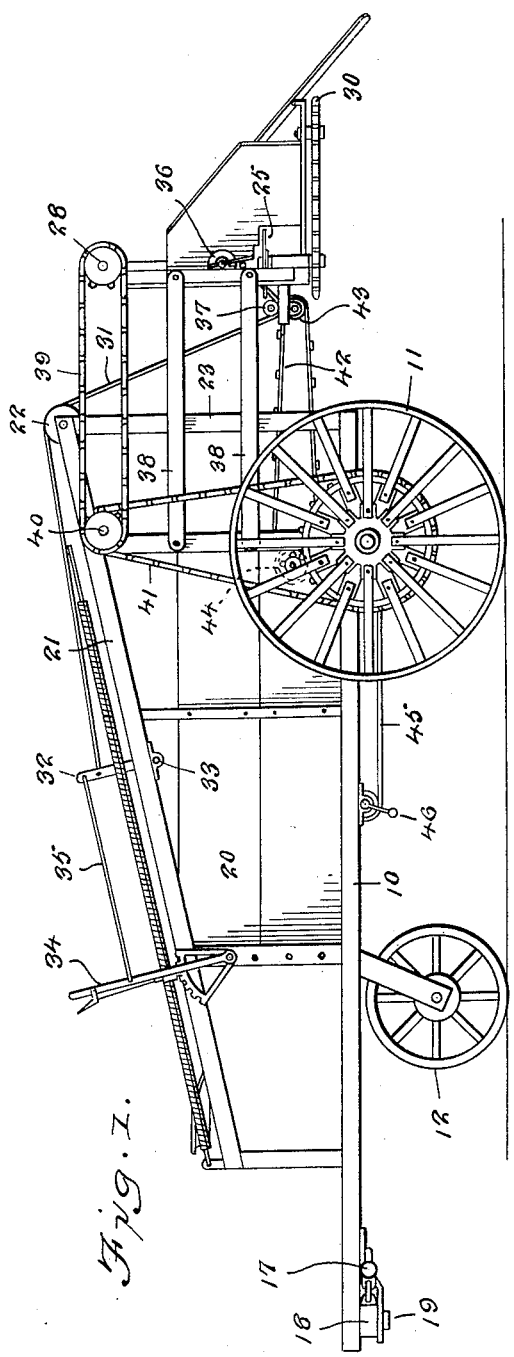
Figure 2 is a top plan view.
Figure 3:
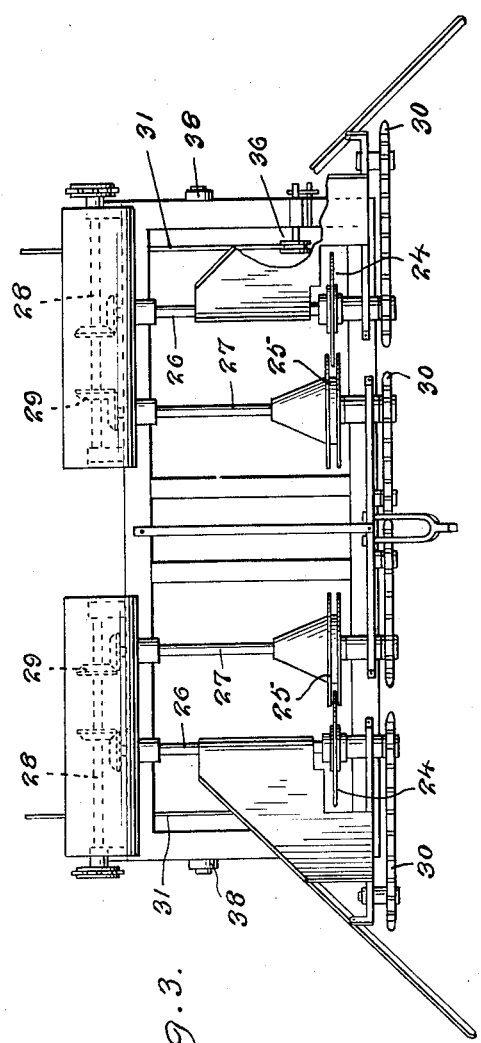
Figure 3 is a front elevational view looking at the head frame.

Figures 4 and 5 are sectional views on the planes indicated by the lines 4—4 and 5—5 respectively of Figure 2.

The invention comprises a vehicular apparatus comprising a frame 10 supported on the forward ground wheels 11 and the rear caster wheel 12, the latter of which is provided with the vertically disposed king spindle 14 mounted in an appropriate bearing in the frame and provided with a cross bar 15, the extremities of which may constitute a foot rest for the operator who, occupying the seat 16, will determine the direction of movement of the machine by foot pressure on one side or the other of the cross bar to shift the caster wheel correspondingly.

The means of propulsion will comprise draft animals which will be positioned on opposite sides of the frame and hitched to the singletrees 17 secured to a cross bar 18 with which the frame is provided, the cross bar being in the nature of a whiffle-tree pivoted as at 19 to equalize the draft on the two animals positioned on opposite sides of the frame.

The frame is provided with the side guards 20 on opposite sides, the upper edges of which are formed with rearward extending downwardly inclined rails 21, at the forward ends of which are mounted the pulleys 22, the frame 10 having upstanding bars 23 at the forward end united with the rails 21 at the point where the pulleys 22 are mounted. The head frame 23 is provided with a duality of pairs of cooperating heading cutters 24 and 25 mounted on shafts 26 and 27 to which motion is communicated by shaft 28 by reason of the beveled gear connections 29 between them and the shafts 26 and 27. The forwardly diverging feed chains 30 by which grain is fed to the cutters are driven in common with the shafts 26 and 27.

The pulleys 22 mentioned above constitute idlers over which are trained the cables 31, the latter being anchored at their rear ends to arms 32 carried on a shaft 33 journaled in bearings in the rails 21. The latch lever 34 positioned adjacent the seat 16 constitutes manual means for actuating the rock shaft 33 by reason of the link connection 35 with one of the arms 32. The forward ends of the cables 31 are connected to take-up pulleys or spools 36 on the head frame, after having been trained over idlers 37 connected to extensions of the head frame. The head frame is operatively mounted on the frame 10 through the instrumentality of link bars 38, arranged in parallel relation and pivotally connected both with the head frame and with the main or supporting frame 10, so as to insure vertical position of the head frame as it is elevated or lowered which may be accomplished by adjustment of the latch lever 34 so as to let down or pull back on the cables 31.

The cutter actuating shafts 28 are chain driven as indicated at 39, these latter chains being driven from a shaft 40 disposed transversely of the frame 10 and being in turn driven from one of the bull wheels 11 by means of a chain 41.

The two sets of heading knives 24 and 25 are arranged to deposit on a common conveyor belt 42 mounted at the forward end on the drum 43 carried by the head frame and at the rear end on a similar drum, pinion driven, as indicated at 24, from the same bull wheel 11 from which the chain 41 is driven.

The conveyor belt being connected at the forward end to the header frame, this forward or receiving end is raised or lowered with the header frame but the rear end remains at a fixed elevation and is arranged to deposit on the dumping belt 45 mounted at the forward end on an appropriate drum on the frame 10 and at the rear end on a correspondingly formed drum which is arranged for actuation with a hand crank 46.

With the draft animals hitched to the singletrees 17, they will follow behind the bull wheels in advancing the apparatus over a field of grain and their heads may be hitched to the vehicular apparatus, so that all the operator may have to do is to steer the device as a whole by so actuating the caster wheel 12 to cause the machine to progress in the desired direction, when the animals will follow the course pointed out by the machine.

The head frame is counterbalanced by means of springs 47 disposed on top of the rails 21 and anchored one end at the rear ends of the rails, being coupled at their ends to the cables 31 at appropriate points between the direction pulleys 22 and the arms 32. By this means the weight of the head frame during adjustment is for the most part taken off of the operator.

The main frame 10 is open between the rear end of the dumping belt 45 and the vertical plane of the king spindle 14, so as to provide a discharge opening for the dumping belt from which the accumulation is removed after the machine has been brought to rest by the rotation of the crank 46, when the contents of the belt may be deposited in a suitable receptacle placed under the discharge opening.

The invention having been described, what is claimed as new and useful is:

1. A grain header comprising a vehicular apparatus embodying a frame having a heading mechanism at the forward end, the frame being provided with an opening at an intermediate point in its length, a dumping belt extending longitudinally of said frame and constituting the bottom thereof ahead of said opening, and a conveyor belt disposed ahead of the dumping belt and arranged to carry the grain cut by the header to the dumping belt for discharge by the latter through the opening in said frame.

2. A grain header comprising a vehicular apparatus embodying a frame having a heading mechanism at the forward end, the frame being provided with an opening at an intermediate point in its length, a dumping belt extending longitudinally of said frame and constituting the bottom thereof ahead of said opening, and a conveyor belt disposed ahead of the dumping belt and arranged to carry the grain cut by the header to the dumping belt for discharge by the latter through the opening in said frame, the heading mechanism being vertically adjustable and the forward end of the conveyor belt being movable therewith but the rear end remaining constantly in the same horizontal plane which is above the plane of the dumping belt.

ERNEST E. BARTLETT.